Figure 1:
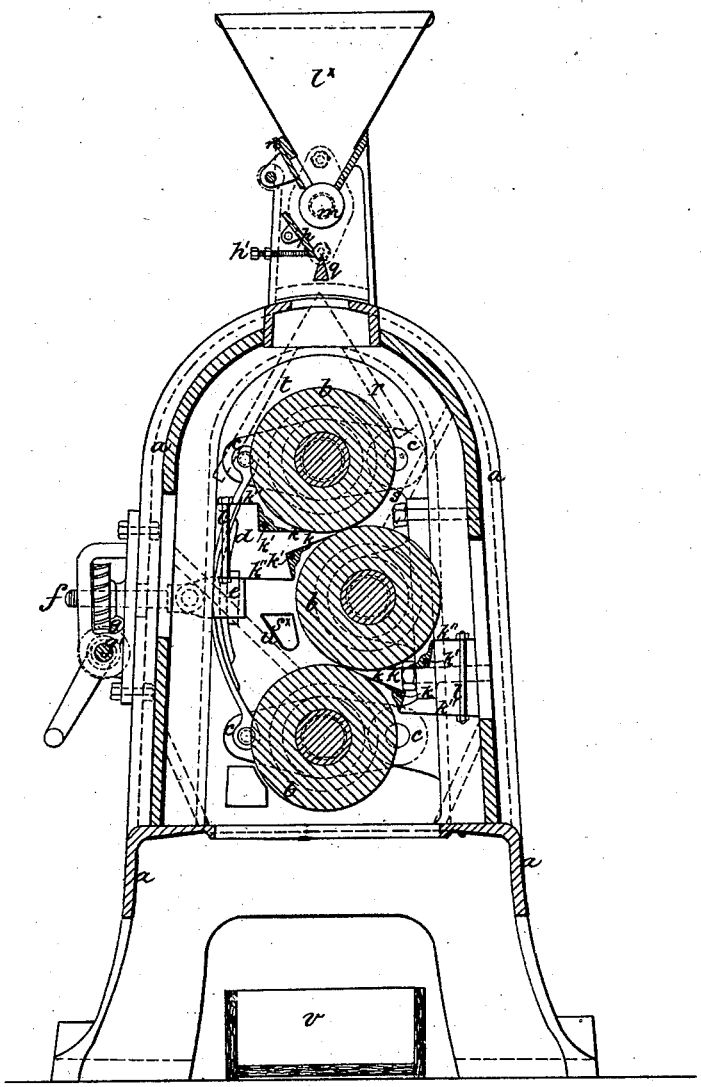

(No Model.) 3 Sheets—Sheet 1.
E. R. & F. TURNER & J. H. CARTER.
ROLLER MILL.

No. 293,990. Patented Feb. 19, 1884.

Witnesses
Lloyd B. Wight
Allan McLane Abert

Inventors E. R. Turner
F. Turner
J. H. Carter
By Attys
Baldwin, Hopkins & Peyton (No Model.) 3 Sheets—Sheet 3.
E. R. & F. TURNER & J. H. CARTER.
ROLLER MILL.

No. 293,990. Patented Feb. 19, 1884.

UNITED STATES PATENT OFFICE.

EDWARD RUSH TURNER AND FREDERICK TURNER, OF IPSWICH, COUNTY OF SUFFOLK, AND JAMES HARRISON CARTER, OF LONDON, ENGLAND.

ROLLER-MILL.

SPECIFICATION forming part of Letters Patent No. 293,990, dated February 19, 1884.

Application filed August 9, 1883. (No model.) Patented in England June 28, 1879, No. 2,626.

*To all whom it may concern:*

Be it known that we, EDWARD RUSH TURNER and FREDERICK TURNER, both of Ipswich, in the county of Suffolk, England, and JAMES HARRISON CARTER, of 82 Mark Lane, in the city of London, England, subjects of the Queen of Great Britain, have invented certain new and useful Improvements in Roller-Mills for Crushing Middlings and other Substances, (for which we have received Letters Patent in Great Britain, No. 2,626, dated June 28, 1879,) of which the following is a specification.

This invention has for its object improvements in roller-mills for crushing middlings and other substances. For this purpose we employ three rollers—one above the other—on horizontal and parallel axes. They are geared together with wheels, which are contained in a casing, at the bottom of which there is oil to maintain thorough lubrication. The bearings of the upper and lower rollers are carried upon levers, which at their outer or free ends are connected by curved springs, formed of steel blades, like carriage-springs. The springs have clips applied at the center, and by screws and nuts upon them any desired strain can be put upon the springs, increasing their curvature or drawing their ends toward each other. The nuts have teeth upon their peripheries, and worms turned by a crank-handle engage with these teeth. By these means the pressure upon the rollers is adjusted; or the levers carrying the bearings of the rollers may be connected by jointed links, to which springs are applied, so as to draw them into inclined positions. The material to be crushed is delivered from a feed-hopper and caused to fall upon a bar of triangular section, which divides it into two parts, which descend on either side of the bar. One part of the feed is led by inclines between the upper and the center crushing-rollers, while the other part of the feed is led in a similar manner between the center and the lower rollers. The crushed material is removed from the faces of the rollers by scraping-blades. One pair of scraping-blades is set immediately in front of the nip of the upper and the center rollers. Another pair is similarly placed in respect to the nip of the center and the lower rollers. The scrapers are mounted upon axes having spring-arms, and in each pair of scrapers these spring-arms are coupled together by screws. By the adjustment of these the scrapers can be set to press against the surfaces of the rollers with a suitable pressure.

In order that our said invention may be most fully understood and readily carried into effect, we will proceed to describe the drawings hereunto annexed.

Figure 2:
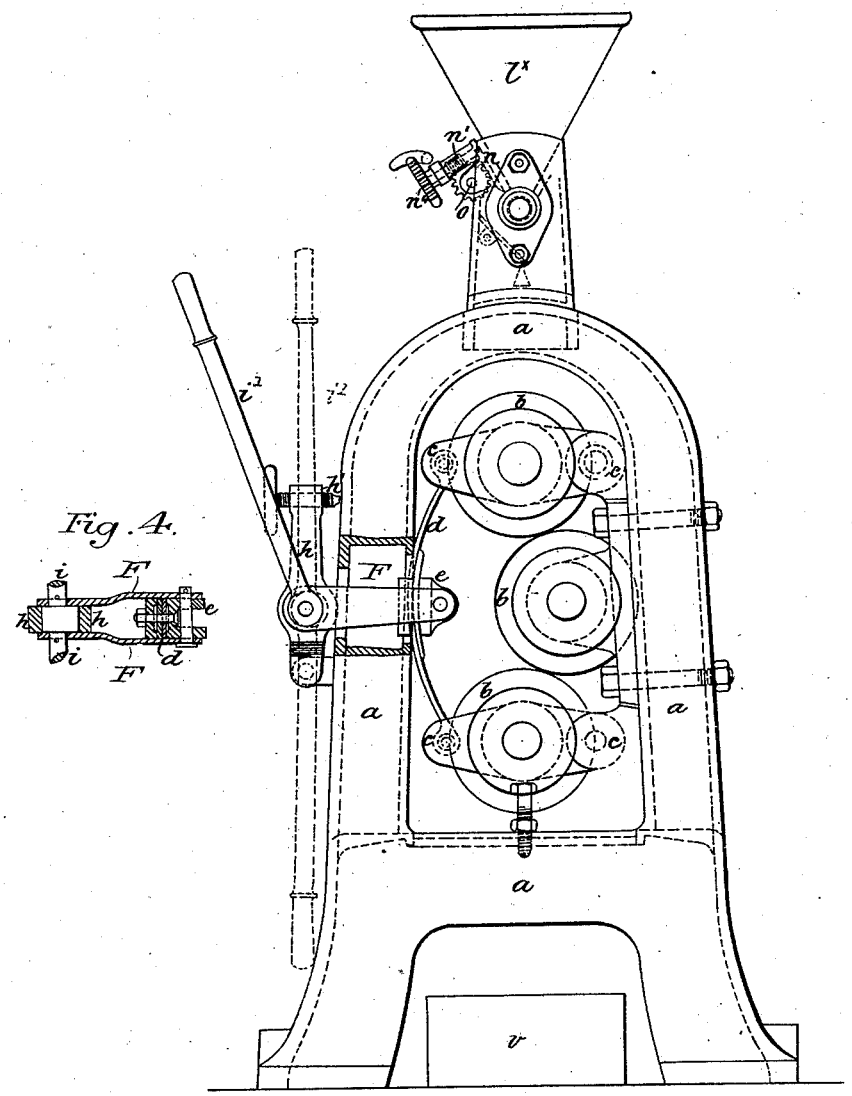
Figure 3:
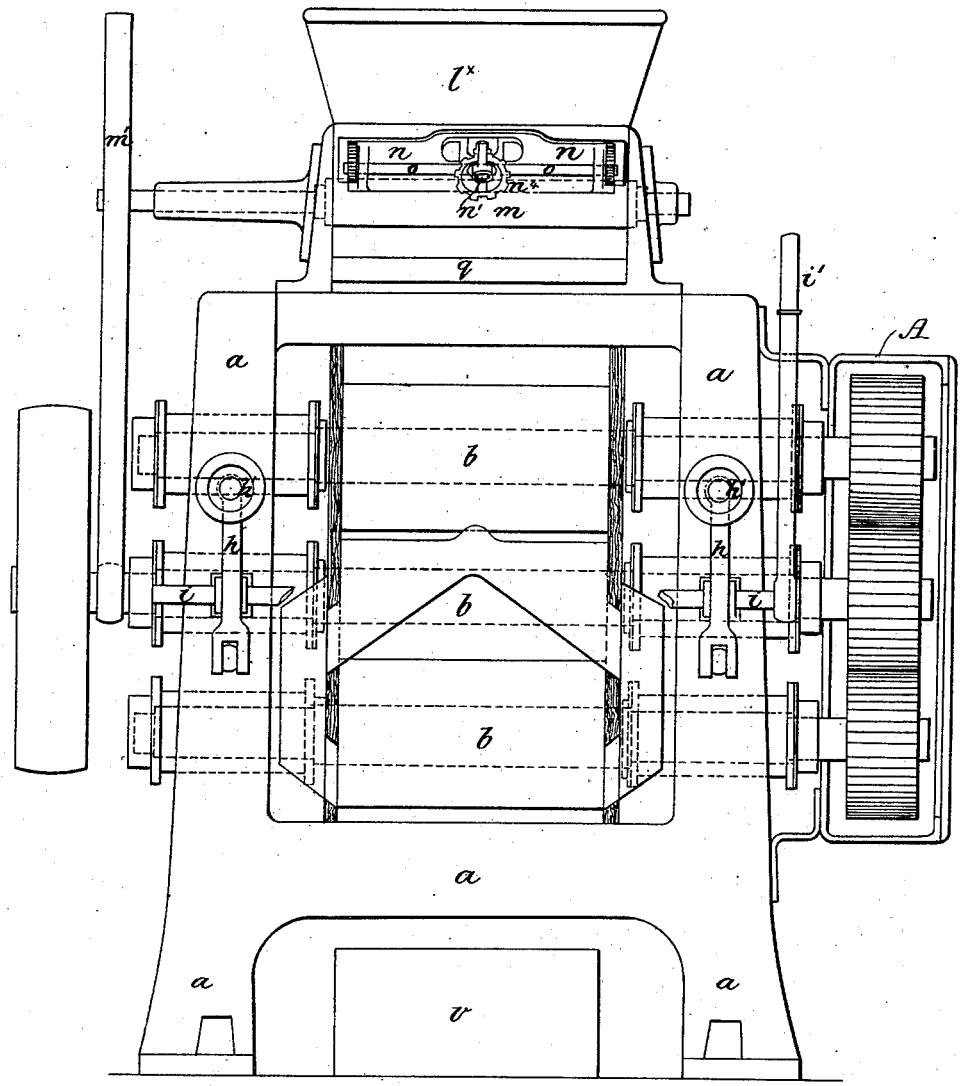

In the drawings, Figure 1 is a sectional elevation of a roller-mill constructed according to our invention. Fig. 2 is a view in elevation, with a portion of the frame broken away, showing some modifications. Fig. 3 is a front elevation of Fig. 2. Fig. 4 is a sectional plan of a portion of the roller-adjusting apparatus.

$a\ a$ is the frame of the mill, and $b\ b\ b$ are the three rollers. They are geared together by spur-wheels on their axes.

A is a casing, in which oil is contained. The teeth of the lowest wheel dip into the oil, and it afterward becomes transferred to the teeth of the other gear-wheels. By this contrivance the wear of the teeth, which would otherwise be rapid, is greatly reduced. The bearings of the middle roller are directly upon the frame, while those of the upper and lower rollers are carried upon the levers $c\ c\ c\ c$, each of these four levers being jointed at one end to the frame. These levers are connected in pairs, being coupled at their other ends by means of two bow-springs, $d\ d$, one for each pair of levers, and at the center of each spring a clip, $e$, is affixed. Two screw-stems, $f\ f$, (one only of which is shown,) are respectively jointed to the respective clips $e\ e$, and in the arrangement shown in Fig. 1 each stem $f$ has upon it a nut with worm-teeth upon its periphery. The nuts can be turned simultaneously, each being actuated by its worm $g$, there being two of these worms on the axis $g'$, which receives a handle upon its end.

In the modified arrangement shown in Figs. 2, 3, and 4 the adjusting mechanism or method of approaching the rollers is somewhat different from that just described. The bow-springs $d\ d$ are connected by links F F to levers $h\ h$, which, at their lower ends, are jointed to the frame, and at their upper are provided with adjusting-screws $h'\ h'$, the ends of which abut upon the frame. The levers $h\ h$ have holes or eyes in them, into which eccentrics carried upon the axis $i$ are received, and this axis serves to connect the levers with the links, the axis passing through the links, which are double. The construction is clearly shown by the sectional plan, Fig. 4. The axis $i$ carries a handle, $i'$, and by turning down this handle the rollers are drawn into contact; but when the handle is raised they are separated by a small space the one from the other. The screws $h'$ serve to regulate the pressure and render it equal at the two ends of the rollers. The rollers $b\ b\ b$ are provided with blade-scrapers $k\ k$, arranged in pairs, and turning upon centers at $k'\ k'$. The scrapers are provided with spring-arms $k''\ k''$, these arms of each pair being drawn together by a screw-bolt, $l$. The scraper-blades can be caused to bear on the surfaces of the rollers $b\ b$ with any desired degree of pressure, and the manner of coupling the scrapers and causing them to mutually support each other results in uniform pressure of the scrapers of a pair upon the rollers. The material to be crushed is fed to the rollers from the hopper $l^x$, which is fitted at the bottom with a small roller, $m$, and a slide, $n$, which can be set nearer to or farther from the surface of the roller. The roller has a pulley, $m'$, on its axis, which receives a belt from a pulley upon the axis of the central roller, $b$, upon which there is also the belt-pulley receiving the driving-belt, by which motion is given to the mill. The slide $n$ is raised by means of the notched hand-wheel $n''$, which carries a worm, $n'$, on its axis gearing into a worm-wheel on the axis $o$. Upon each end of this axis $o$ is a pinion gearing into racks fixed to the hopper-sides, the axis $o$ turning in bearings fixed to the slide itself, and rising and falling with it, and so regulating the feed. Provision is made for locking the hand-wheel $n''$ in any position, as the drawings show. The material falls onto an inclined board, $p$, which is adjustable by screws $p'\ p'$, and thence onto the wedge-shaped bar $q$. By suitably setting the board $p'$ the material may be caused to fall upon the bar $q$ in such a manner as to be divided by it into two approximately-equal parts, and each of these parts forms a uniform stream equally dense in every part, so that the feed is uniform throughout the length of the rollers. One part of the feed falls upon the board $r$, and thence onto the board $s$, which leads it between the upper and the middle rollers, $b\ b$, by which it is crushed more or less fine, according to the adjustment of the rollers. The crushed material is stripped from the rollers by the scrapers $k$, and, falling into the inclined trough $s^x$, it is led away. The other portion of the feed falls upon the board $t$, and thence upon the board $u$, and is led between the center roller and the lower of the rollers $b\ b$. It is crushed, and, together with the material from the upper and middle rollers, is received into the receiver $v$. Thus it will be seen that in this mill the amount of the feed, also the division of the feed between the two crushing-points, also the pressure of the crushing-rollers the one on the other, also the pressure of the scrapers upon the faces of the rollers, are all under the most complete control.

The mill is used with smooth rollers for crushing semolina and middlings, and with rollers fluted in the usual way for breaking or grinding wheat or other grain.

Having thus described the nature of our said invention and the manner of performing the same, we would have it understood that we claim—

1. The combination of the adjustable rollers, the levers by which they are carried, and the springs by which the levers are coupled in pairs, substantially as and for the purpose hereinbefore set forth.

2. The combination of the frame, the adjustable rollers, the intermediate roller mounted in bearings of the frame, the levers carrying the adjustable rollers, and the springs acting upon the levers for drawing the adjustable rollers toward the intermediate roller, substantially as hereinbefore set forth.

3. The combination of the frame, the adjustable rollers, the intermediate roller mounted in fixed bearings, the springs, the spring-connected levers supporting the adjustable rollers, and adjusting mechanism acting upon said springs, substantially as and for the purpose hereinbefore set forth.

4. The combination of adjacent rollers one above the other, the pair of pivoted scrapers, also one above the other, and acting upon the respective rollers, the spring-arms of the scrapers, and their connecting screw-bolt, substantially as and for the purpose hereinbefore set forth.

5. The combination of the hopper from which the material to be operated upon is supplied, the adjustable inclined board upon which the material falls as delivered from the hopper, and the angular or wedge-shaped bar, against which the material is directed by said adjustable board, as and for the purpose hereinbefore set forth.

EDWARD RUSH TURNER.
FREDERICK TURNER.
JAMES HARRISON CARTER.

Signed by the above-named James Harrison Carter in the presence of—
    J. WATT,
    JNO. DEAN,
*Both of 17 Gracechurch Street, London.*

Signed by the above-named Edward Rush Turner and Frederick Turner in the presence of—
    GEO. JACOB,
    HARRY G. S. FENN,
*Clerks to Messrs. Steward & Rouse, Solicitors, Ipswich.*